July 4, 1961 E. ONG ET AL 2,990,802
SHOCK-ABSORBING AND WEAR-RESISTANT PLASTIC
AND METAL STRIP ASSEMBLIES
Filed March 5, 1959
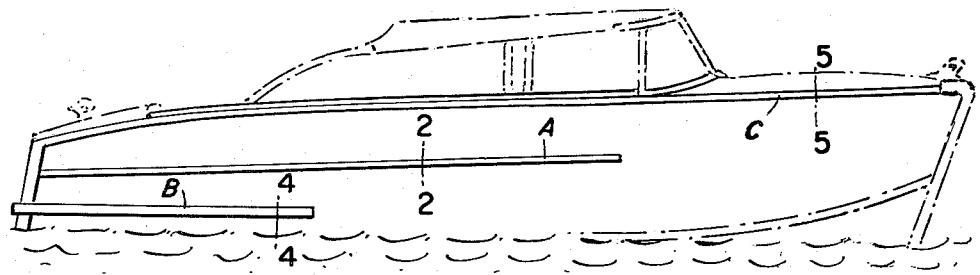
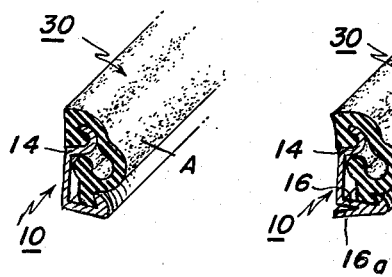
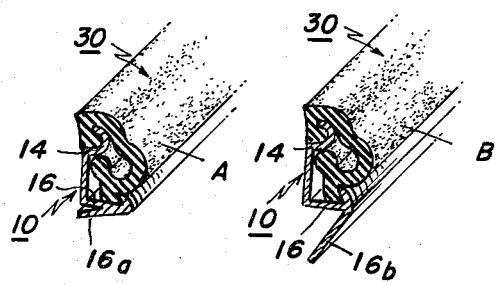
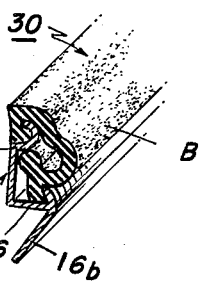
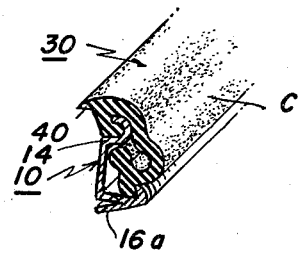
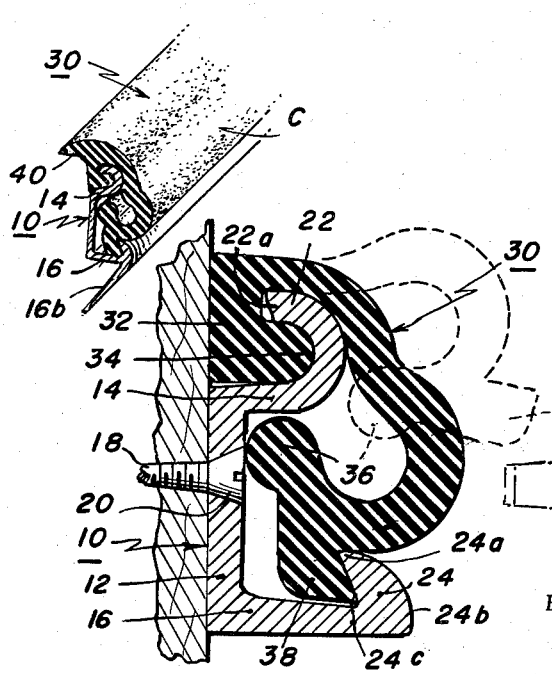
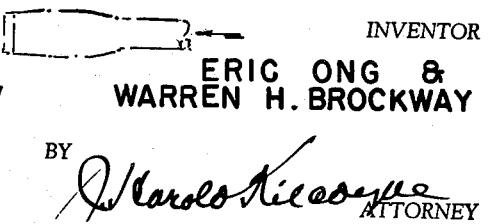
INVENTOR
ERIC ONG &
WARREN H. BROCKWAY
BY
ATTORNEY United States Patent Office 2,990,802
Patented July 4, 1961

2,990,802
SHOCK-ABSORBING AND WEAR-RESISTANT PLASTIC AND METAL STRIP ASSEMBLIES
Eric Ong and Warren H. Brockway, Newnan, Ga., assignors to The William L. Bonnell Company, Inc., Newnan, Ga.
Filed Mar. 5, 1959, Ser. No. 797,363
12 Claims. (Cl. 114—219)

This invention relates to improvements in shock-absorbing and wear-resistant plastic and metal strip assemblies, and more particularly to an improved type of plastic and metal strip-form assembly as aforesaid especially although not exclusively adapted for use as rub rails, bumper and gunwale strips and the like for the boating industry, and which is also suitable for use as interior boat trim.

While attempts have been made heretofore to devise an effective strip-form assembly of metal and plastic shapes to serve as so-called rub and bumper rails for small marine craft, such have not proved successful for various reasons. For example, the prior assemblies were not of the simple construction which permitted their easy attachment but, on the other hand, usually required attaching techniques which made their use impractical. Another objection to the prior assemblies serving similar function was that the attaching means employed to secure them to the boat hull were open to view and hence resulted in unsightly overall appearance. Another form of prior plastic and metal rub rail was characterized by heavy, bulky appearance inconsistent with the trim clean lines of modern small-boat architectural design. The prior all-metal bumper and rub rail assemblies for boat use were similarly open to the objection of being heavy in appearance and expensive and difficult to install, and the all-plastic rub rails could not be effectively attached to a boat hull or equivalent supporting surface with the requisite security of attachment to enable them to withstand the substantial shocks and rubbing action which they are sometimes called upon to withstand.

Accordingly, it is a primary object of this invention to provide a plastic and metal rub rail and/or bumper strip assembly that provides the utmost in ease of attachment to a boat side or similar surface and which at the same time functions effectively in preventing the appearance of the boat from being marred or damaged by rubbing on or bumping against a dock or other boat, for example.

Another important object of the invention resides in the provision of a plastic and metal rub rail or bumper strip assembly that maintains a smooth, clean appearance consequent to the attaching devices employed to secure the assembly in use position being completely hidden from view.

Another object of the present invention is to provide a plastic and metal rub rail and bumper assembly made of long-lasting and tough materials which will not be materially affected by weather, salt water and/or abrasive action.

Yet another object of the invention is to provide a rub rail or bumper for a boat capable of effectively protecting the side-wall surfaces or gunwale thereof from damage or marring while at the same time presenting a clean esthetic appearance, and which is characterized by strips of plastic, such as vinyl, and metal, such as aluminum, which are so shaped that they may be readily assembled to one another during their attachment to the hull or gunwale.

Another and highly practical object of the present invention is to provide the small boat manufacturer or owner with an effective rub rail or bumper construction comprising a metal attaching strip which may be simply anchored down as by screws and a shock-absorbent and wear-resistant strip of vinyl plastic that can be simply assembled to said attaching strip by initially engaging it therewith and finally snapping it into place thereon as the operation of attaching the metal strip proceeds.

The above and other objects and features of advantage of the rub rail, bumper and gunwale strip according to the present invention will appear from the following detailed description thereof taken with the accompanying drawings, wherein—

FIG. 1 portrays a typical small boat equipped with rub rail, bumper and gunwale strip assemblies of the invention;

FIG. 2 is a cross-section taken on line 2—2 of FIG. 1, illustrating the sectional configuration of the plastic and metal strips making up one form of rub rail assembly as herein proposed;

FIG. 3 is a view similar to FIG. 2, which illustrates another embodiment of rub rail construction;

FIG. 4 is a section taken on line 4—4 of FIG. 1, which illustrates a further somewhat heavier form of rub rail assembly suitable for use as a boat bumper strip;

FIG. 5 is a section taken along line 5—5 of FIG. 1, illustrating yet another modified form of basic rub rail assembly adapting same for use as a gunwale strip;

FIG. 6 is a view similar to FIG. 5 but illustrating a somewhat modified construction thereof; and FIG. 7 is an enlarged sectional view of the rub rail assembly shown in FIG. 2, which illustrates the manner in which the metal strip or channel constituting the attaching and supporting member of the assembly is first anchored down and the plastic (vinyl) is thereafter assembled thereto with a snap action.

Referring to FIGS. 2 and 7, which show the two components making up the perhaps simplest form of assembly according to the invention which is intended to serve as a rub rail A for a small pleasure-type boat located as in FIG. 1, as well as the sectional configuration or "shape" of each of said components, it will be observed that said rub rail comprises an elongated strip-form attaching and supporting member 10 and a similarly elongated and strip-form shock-absorbing and wear-resistant plastic member 30 assembled thereto. First considering said attaching and supporting member 10, such is of rigid metallic construction, being preferably made of aluminum whereby it is rustproof, resistant to weather and/or the corrosive effect of salt water; it has general U-shape cross-section whereby it defines a longitudinally continuous channel; and it is moreover turned on its side so that its channel, which is of course defined by its bottom wall 12 and its side walls 14, 16, opens sidewardly, i.e. forwardly, away from said bottom wall, which latter is resultingly substantially vertically disposed so that it may be placed flat against a vertical or substantially vertical surface such as a boat side. Said U-shaped member 10 may be secured to the hull side as by screws 18 inserted through holes 20 which may either be predrilled at intervals along the length of the bottom wall 12 or drilled therein at the site of installation or during actual installation, the screws 18 of course threading directly into the hull side-wall or planking making up same. Other fastening means such as rivets may of course be substituted for the aforesaid screws.

To secure the companion shock-absorbent and wear-resistant strip member 30 thereto, the U-member 10 is formed with special securing means contained within its shape or section. More particularly, the side walls 14, 16 of the member 10 terminate at their outer ends in longitudinally extending or running hook-like formations 22, 24, hereinafter for convenience referred to as hooks. The aforesaid upper hook 22 is formed as by a U-bend in the outer edge portion of the upper side wall 14 of the channel, said U-bend being turned or directed so that the hook is disposed outwardly of the U-member channel and with its bill 22a facing rearwardly or towards the surface to which the U-member 10 attaches. As distinguished therefrom, the lower hook 24, although disposed unidirectionally with respect to the upper hook 22, i.e. relatively rearwardly, is directed inwardly so as to point into the channel of said U-member 10 much as an inturned flange. Preferably, the bill 24a of said lower hook is defined by a smoothly rounded outer surface 24b and by an under surface 24c which is preferably a plane surface that is inclined at an angle of approximately 75° to the horizontal.

As also seen in FIG. 7, the lower side wall 16 of said U-member 10 is preferably somewhat deeper than the companion upper wall 14, and thus the lower hook 24 is disposed a small distance outwardly of the upper hook 22. Consequent to said lower hook 24 extending into the channel of the U-member 10 as aforesaid, the width of the channel mouth is substantially decreased. To partially compensate for this loss of mouth width and thereby facilitate the assembly of the companion plastic-strip member 30 with the U-member 10, the side walls 14, 16, or at least their inner surfaces, may be formed with a slight divergence as effects a small yet requisite widening of the channel mouth, such also facilitating predrilling of the holes 20.

Next considering the aforesaid plastic member 30 in detail, such comprises an elongated, specially sectioned strip of plastic material such as vinyl resin, although other plastic materials having the requisite properties of resiliency, flexibility, shockproofness, toughness and resistance to wear, etc. are suitable. In transverse section, the strip body is shaped somewhat like the numeral "3," whose upper and lower edge portions which extend from the outwardly bellied or bulged body portion of the strip are so formed as to lockably cooperate with the hooks 22, 24 of the U-member 10. More particularly, from the upper edge of the strip body depends a substantially vertically disposed flange 32 having a plane outer face which terminates in a curled-under rib or spur 34 which extends into the hollow of the bellied body portion; and the lower edge of the strip body is continued as an upwardly curled flange 36 which is extended downwardly from the strip body as a depending spur 38.

Such formation on the upper edge portion of the vinyl strip 30, of course assuming proper dimensioning thereof, results in said upper edge portion being formed complementally both to the aforesaid upper hook 22 of the U-member 10, and to the space between said upper hook and the surface against which the U-member is placed, and hence renders said upper-edge portion capable (a) of forming a seal to keep water out of the U-member and (b) of interlocking with said upper hook 22 when the upper edge portion of the strip 30 is assembled to the corresponding upper edge portion of the U-member 10 by interfitting their complemental top-edge portions. The above described formation of the lower edge portion of the vinyl strip 30 is also such, again assuming proper dimensioning thereof, as to enable the extended flange 36 and its depending spur 38, upon the strip lower-edge portion being pushed into the channel of the U-member 10, not only to substantially fill the channel but also in so doing to interlock with the lower hook 24 of said U-member. More particularly, the overall length of said upwardly directed flange 36 and its depending spur 38 as provided on the lower edge portion of the vinyl strip 30 substantially equals the width of the channel proper of said U-member 10, with the flexibility of the spur 38 enabling same to give sufficiently as permits it to move past the pointed bill 24a of said lower hook and thereupon to snap in under said hook, thus positively locking the lower edge portion of the strip 30 in the channel of the U-member 10.

As further seen in FIG. 7, the upper portion of the body of the vinyl strip 30 is shaped to substantially correspond to the outside curvature of the upper hook 22 of the U-member, whereby the vinyl strip, when finally assembled, extends forwardly around and thus completely encompasses said upper hook. However, the lower curved portion of the plastic strip body is bellied outwardly so that it forms a bulbous nose portion running the length of the final assembly which effectively overlaps the lower side wall 16 and the hook 24 of the U-member 10. Being hollow and made of flexible and resilient yet tough material, said nose portion imparts shock-absorbing and wear-resistant properties to the final assembly, which makes it ideally suited for use as a rub rail and bumper rail for small boats. Moreover, even though the force acting on the final assembly is substantial, the bulbous formation on the vinyl strip 30 aids in assisting said strip to absorb same, thus protecting the metal U-strip 10 against collapse under all normal and even abnormal forces to which the rail assembly as a whole is subjected.

FIG. 3 illustrates a slight modification of the rub rail assembly shown in FIGS. 2 and 6, according to which the lower side wall 16 carries a leg 16a inclining downwardly-rearwardly from its outer edge. This leg increases the installed vertical dimension of the rub rail as a whole whereby it is adapted to cover a greater area of the boat. This is a feature of advantage when the rub rail is applied over joints or gaps in the outside material of the boat to mask the same.

FIG. 4 illustrates another variant of the basic FIG. 2 rub-rail assembly which adapts same to use as a bumper strip or rail B located as in FIG. 1, i.e. one that is equally if not primarily suited by its location by taking bumps rather than rubbing forces and which accordingly necessitates a heavier and more rugged construction. However, except for its larger size, the bumper has the same basic construction and principle of assembly as that characterizing the FIG. 2 rub rail, but it adds thereto a deep buttress flange 16b serving, by virtue of its depth and inclination, to substantially reinforce the side wall 16 of the metallic U-member component of the assembly against being buckled. Said flange 16b also substantially increases the installed vertical dimension of the bumper strip for the purpose described above in connection with leg 16a of the FIG. 3 form.

FIGS. 5 and 6 illustrate the basic rub rail of the FIGS. 3 and 4 forms modified to serve as a gunwale strip or rail located as at C, FIG. 1. More particularly, the plastic insert 30 thereof is provided along its topmost edge with a blade-like tongue or rib 40 which extends relatively rearwardly therefrom. When properly placed along the top zone of the hull side-wall, which is usually considered to constitute the gunwale, the tongue 40 overlaps the decking and thus offers a high degree of protection for the corner between gunwale and decking.

Preferably, both the metallic U-member 10 and the final shock-absorbing and rail strip 30 are formed as extrusions and thus each said component has a clean, smooth appearance and may be made economically as compared to other methods of strip fabrication. Preferably, the metal and plastic strips are supplied in unit lengths of, say, twelve feet, but such may vary according to manufacturing and use requirements.

The manner of installing rub and/or bumper and/or gunwale rails as aforesaid is outstanding for its ease and simplicity. For example, the metal U-member 10 turned on its side so that its channel opens away from the boat side to which it is to be secured is placed flat against said surface. Previous thereto, the upper edge portion of the vinyl strip, i.e. its top flange 32 and its spur 34, has been interfitted with the running top hook 22 of said U-member, but the lower edge portion of said strip which carries the upwardly under flange 36 and its spur 38 is left disengaged, with the result that due to the flexibility of the strip, said lower edge portion may be raised as needed to uncover the U-member channel. The U-member is now anchored by screwing the same to the hull side wall by screws 18 inserted through the aforesaid screw holes 20 provided in the bottom wall 12 of said member, which is an easily performed operation since the lower edge portion of the vinyl strip 30 may be progressively raised to its broken line position shown in FIG. 7 as the screws are fastened one by one along the length of the U-member as by a screw driver or similar tool (also shown in broken lines). Since, as above explained, the top edge portion of the vinyl strip complements both the top hook 22 of the U-member and the space between said hook and the hull surface against which the U-member is placed for installation, fastening down of the U-member as aforesaid also positively locks the top edge portion of the vinyl strip in place.

Upon screwing down of the U-member 10 and top edge portion of the vinyl strip 30 as aforesaid, the bottom edge portion of said strip is finally secured as by forcing its upwardly directed bottom flange 36 and spur 38 through the mouth of the U-member channel as results in said spur 38 moving past and then snapping in under the lower hook 24, as effects positive locking of the strip lower edge portion in its finally assembled position. Should it happen that the curvature or bowing of the body portion of the vinyl strip is increased consequent to placement and final locking of said lower edge portion as aforesaid, such is of advantage since it results in the strip having greater shock-absorbing capacity. It will be understood that the operation of anchoring down the lower edge portion of the vinyl strip may progress along with that of screwing down the U-member 10, or it may await the completion of said screwing down operation.

In addition to the superior functional attributes of the rub rail or bumper or gunwale strip of this invention, such is also notable for its clean two-tone appearance which combines the best features of extruded aluminum and vinyl shapes in an unusual arrangement that is also esthetic. It will be appreciated that smoothness and cleanness of line are also obtained consequent to the fact that the respective fastening means employed both to anchor the rail to the boat and to lock the strip components together are completely hidden, with the result that only the finished surfaces of the vinyl and metal strips are viewable.

As many changes could be made in carrying out the above constructions without departing from the scope of the invention, it is intended that all matter contained in the above description or shown in the accompanying drawing shall be interpreted as illustrative and not in a limiting sense.

We claim:

1. For use as a rub rail, bumper strip and the like for boats, a strip-form assembly comprising an elongated metal strip of U-section defining a longitudinally continuous channel and including a bottom wall which is adapted to be engaged flat against a side surface of a boat whereby said channel opens forwardly therefrom and spaced upper and lower side walls which terminate in longitudinally extended hook-like formations, said hook-like formations opening towards said bottom wall, one said hook-like formation being disposed outwardly of the channel and the other said hook-like formation being disposed within the channel, and a correspondingly elongated flexible rub rail and/or bumper strip operatively related to said metal strip and having first and second longitudinal edge portions, each of said portions including means extending longitudinally therealong and being cooperated with said hook-like formations, the first edge-portion means extending over and thence beneath said one hook-like formation and having shape complemental to the space between said formation and the boat side surface thereby to substantially completely fill said space and second edge-portion means extending into said channel and being disposed relatively rearwardly of and being lockingly engaged by said other hook-like formation, the combination and arrangement being such that when the strips are brought together and said first edge-portion means interfitted with said one hook-like formation and the metal strip thereupon fastened to the side surface of the boat, said strips are positively secured together along their respective interfitted edges.

2. An assembly substantially as set forth in claim 1, wherein said second edge-portion means has effective width which is substantially equal to the width of said channel and includes a flexible portion which is adapted to snap in under said other hook-like formation.

3. An assembly substantially as set forth in claim 1, wherein said flexible strip extends forwardly across said channel and has a hollow, bellied out body portion which overhangs but does not obscure the forward surface of said other hook-like formation.

4. An assembly substantially as set forth in claim 1, wherein the upper side wall of said channel-sectioned metal strip is provided with said one hook-like formation.

5. An assembly substantially as set forth in claim 1, wherein the upper side wall of said channel-sectioned metal strip is provided with said one hook-like formation which has the shape of a U-bend, and wherein said flexible strip has section roughly that of the numeral 8 and said first edge-portion means depends from the upper longitudinal edge thereof as a substantially vertical flange terminating in an angularly turned spur which together interfit said U-bend, and said second edge-portion means extends from the lower longitudinal edge thereof as an upright flange having a rib-like spur depending therefrom, said upright flange and its spur having combined vertical height which is substantially equal to the width of the said channel, said depending spur having sufficient flexibility as to enable said second means to be moved bodily past said other hook-like formation into said channel and thereupon to snap in under said hook-like formation.

6. An assembly substantially as set forth in claim 1, wherein said metal strip is made of aluminum and said flexible strip is made of vinyl plastic.

7. An assembly substantially as set forth in claim 1, wherein the upper channel-defining side wall of the metal strip is provided with said one hook-like formation and said first edge-portion of said flexible strip is further provided with a relatively rearwardly disposed, longitudinally extending tongue which is adapted to overlap the decking of the boat when said metal strip is fastened to the gunwale portion of the boat.

8. An assembly substantially as set forth in claim 1, wherein said metal strip also includes a longitudinally extending depending leg which inclines rearwardly from the outer edge of the lower channel defining side wall.

9. A fastening and mounting strip for a composite metal-flexible rub and/or bumper rail assembly comprising an elongated metal strip of U-section defining a longitudinally continuous channel having a bottom wall which is adapted to be engaged flat against and to receive fastener means for fastening said strip to a surface to be protected from marring, rubbing and the like and substantially plane terminating at their outer ends in longitudinally extending hook-like formations which open generally towards said bottom wall, one said hook-like formation being disposed outwardly of the channel and the other said hook-like formation being disposed within the channel, said hook-like formations together functioning to lockably mount a correspondingly elongated rub rail and/or bumper flexible strip to said metal strip.

10. A fastening and mounting strip substantially as set forth in claim 9, wherein said one hook-like formation comprises a rearwardly opening U-bend extending along the outer edge of one channel side-wall and said other hook-like formation comprises an angularly directed flange on the outer edge of said other channel side-wall extending at an angle of about 75° from said side-wall into said channel.

11. A shock-absorbing and wear-resistant rub rail and/or bumper strip for a composite metal-flexible rub and/or bumper rail assembly comprising an elongated flexible strip having a hollow, bellied out body portion and longitudinally extending edge portions which constitute the sole means with which said flexible strip is provided for mounting same on the metal component of said assembly, one edge portion comprising a flange depending from the corresponding edge of the body portion and terminating in a curled-under spur extending generally into the hollow of said body portion, the other edge portion comprising an inturned flange which curls toward said spur and itself has a depending flexible locking spur.

12. A shock-absorbing and wear-resistant strip substantially as set forth in claim 11, wherein the body portion of the strip in transverse section has the general configuration of the numeral 3.

References Cited in the file of this patent

UNITED STATES PATENTS

| | | |
|---|---|---|
| 1,936,113 | Jelliffe | Nov. 21, 1933 |
| 1,972,283 | Zimmers | Sept. 4, 1934 |
| 2,316,035 | Westrope | Apr. 6, 1943 |
| 2,681,716 | Black | June 22, 1954 |
| 2,705,820 | Torrence | Apr. 12, 1955 |
| 2,873,993 | Savke | Feb. 17, 1959 |
| 2,910,033 | Wiesburg | Oct. 27, 1959 |

FOREIGN PATENTS

| | | |
|---|---|---|
| 912,303 | Germany | May 28, 1954 |